United States Patent [19]

Harvey et al.

[11] 4,268,145
[45] May 19, 1981

[54] FILM CARTRIDGE ASSEMBLY

[75] Inventors: Frederick W. Harvey, Webster; Gurdip S. Sethi; Stephen L. Sikorski, both of Rochester, all of N.Y.

[73] Assignee: Eastman Kodak Company, Rochester, N.Y.

[21] Appl. No.: 118,272

[22] Filed: Feb. 4, 1980

[51] Int. Cl.³ .............................................. G03B 1/00
[52] U.S. Cl. .................................................. 354/121
[58] Field of Search .................. 354/121, 275, 250; 352/102, 103

[56] References Cited

U.S. PATENT DOCUMENTS 1,902,278 3/1933 Chase .................................. 352/102
2,188,974 2/1940 Dilks .................................. 354/121
2,531,651 11/1950 Tait et al. ........................... 354/121

Primary Examiner—Donald A. Griffin
Attorney, Agent, or Firm—M. S. Sales

[57] ABSTRACT

A photographic cartridge assembly includes (1) an opaque casing with an exposure window in its front wall and (2) a film unit rotatably mounted in the casing such that successive film portions can be aligned with the exposure window. An opaque cover member is mounted in the casing between the front wall and the film unit for oscillatory movement about an axis, both parallel to the axis of rotation of the film unit and between the exposure window and the axis of rotation of the film unit, into and out of alignment with the exposure window.

6 Claims, 7 Drawing Figures

FILM CARTRIDGE ASSEMBLY

BACKGROUND OF THE INVENTION

Cross-Reference to Related Applications

Reference is hereby made to commonly-assigned copending U.S. Patent Applications Ser. No. 931,053 entitled PHOTOGRAPHIC FILM CARTRIDGE ASSEMBLY AND CAMERA filed in the name of G. S. Sethi on Aug. 4, 1978, and now U.S. Pat. No. 4,194,822 issued Mar. 25, 1980 and Ser. No. 106,630 entitled FILM CARTRIDGE ASSEMBLY WITH PRESSURE PLATE filed in the name of G. S. Sethi on Dec. 26, 1979.

FIELD OF THE INVENTION

The present invention relates to film cartridge assemblies for use with cameras and, more specifically, to a film cartridge assembly including an improved configuration for conserving space.

DESCRIPTION OF THE PRIOR ART

It is commonplace to enclose photographic film in a cartridge, cassette, magazine, or the like, designed to afford convenient loading of a camera. Commonly-assigned U.S. Patent Application Ser. No. 931,053, entitled PHOTOGRAPHIC FILM CARTRIDGE ASSEMBLY AND CAMERA filed on Aug. 4, 1978, in the name of G. S. Sethi, shows a configuration wherein a generally circular exposure region is provided on a disk-shaped sheet of film for incremental rotation in an enclosure to bring successive portions of the exposure region into alignment with the camera's optical axis.

In the aforementioned patent application, a film disk is mounted on a central core to form a film unit rotatably supported within a protective casing. The casing is formed of a rigid material to protect the film from reasonably expected rough handling, and has an exposure window. A cover member having an opaque leaf portion is coaxially rotatable with the film disk. When the cartridge assembly is not in a camera, the leaf portion underlies the casing exposure window to prevent light which enters through the window from fogging the film. Once the cartridge assembly is loaded into a camera, the cover member can be rotated to an exposure window opening position.

Because the cover member rotates concentrically with the film unit, it occupies the same radial space in its window opening position as in its window closing position. However, while it is necessary that the cover member extend a predetermined distance from the disk axis to adequately cover the exposure window, it need not extend as far radially in its open position. To do so wastes space in the cartridge.

SUMMARY OF THE INVENTION

In accordance with the present invention, a photographic cartridge assembly includes (1) an opaque casing with an exposure window in its front wall and (2) a film unit rotatably mounted in the casing such that successive film portions can be aligned with the exposure window. An opaque cover member is mounted in the casing between the front wall and the film unit for oscillatory movement about an axis, different than the axis of rotation of the film unit, into and out of alignment with the exposure window. In a preferred embodiment of the present invention, the axis of oscillation of the cover member is both parallel to the axis of rotation of the film unit and between the exposure window and the axis of rotation of the film unit.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings in which.

DESCRIPTION OF THE PREFERRED EMBODIMENT

Various terms such as "cartridge," "cassette," and "magazine" have been used to refer to film containers. Such a container, when loaded with film, is herein referred to as a "cartridge assembly." Because cartridges, cartridge assemblies, and photographic cameras for use therewith are well known, the present description is directed in particular to elements forming part of or cooperating more directly with cartridge assembly elements to which the present invention is specifically directed.

The present invention is an improvement of the cartridge assembly described in aforementioned U.S. Patent Application Ser. No. 931,053. Any structure not shown herein may take the form shown in that application, and the disclosure of such application is hereby specifically incorporated into the present description. Apparatus that is not specifically shown or described herein or in the incorporated application is understood to be selectable from apparatus known in the art.

Figure 1:
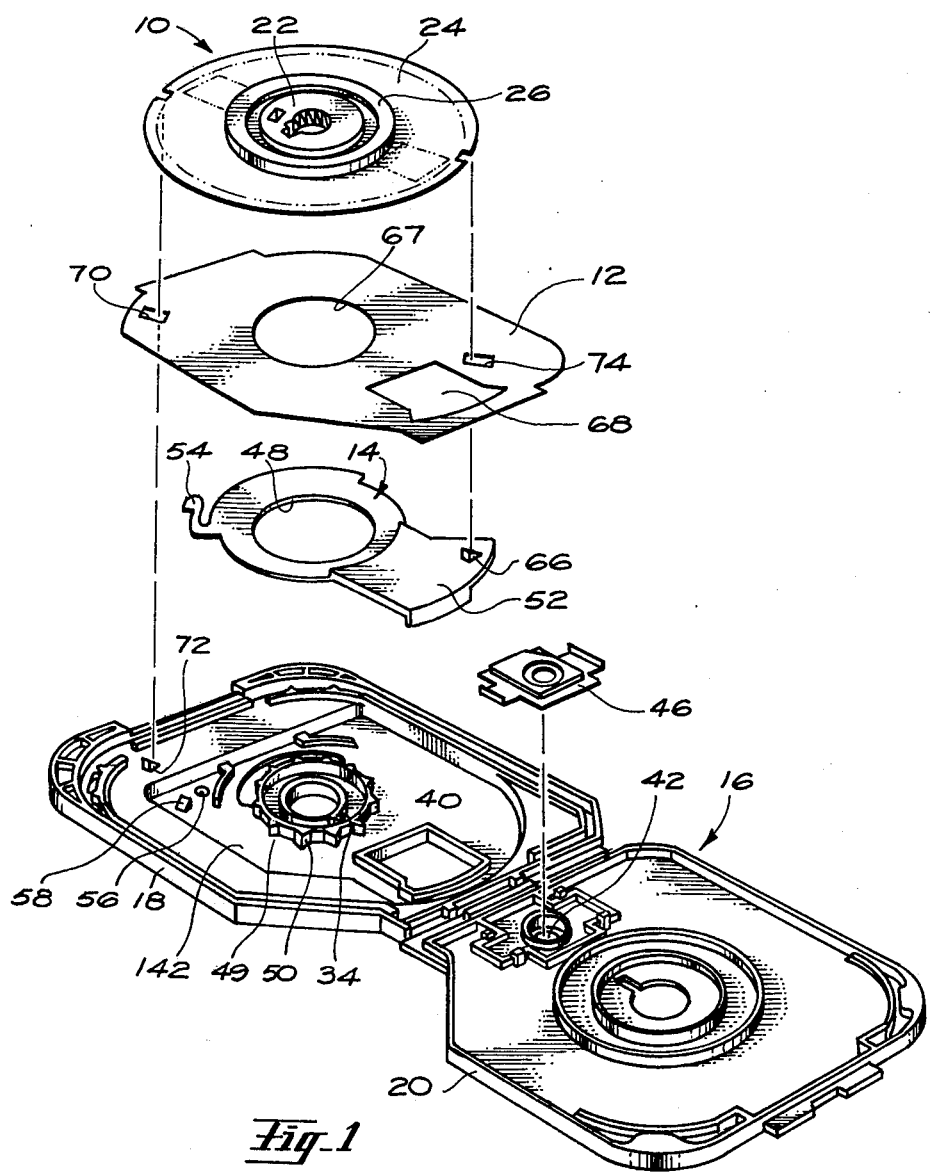
FIG. 1 is a view in exploded perspective of an open film cartridge assembly in accordance with the present invention.
Figure 2:
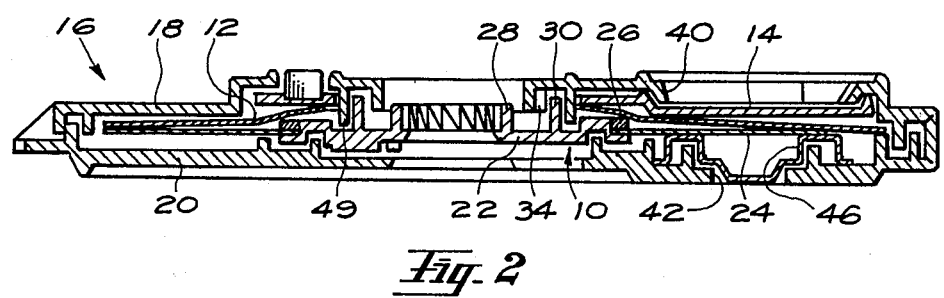
FIG. 2 is a sectional view of the closed cartridge assembly of FIG. 1.

A cartridge assembly, shown in exploded perspective in FIG. 1 and in sectioned elevation in FIG. 2, includes a film unit 10, a separator layer 12, a cover member 14, and a casing 16 with front and rear parts 18 and 20, respectively. The terms "front" and "rear" are used herein with reference to the orientation of the cartridge assembly during actual use of the apparatus described. That is, the front of the cartridge would face along the camera's optical axis in a direction toward the taking lens.

Figure 3:
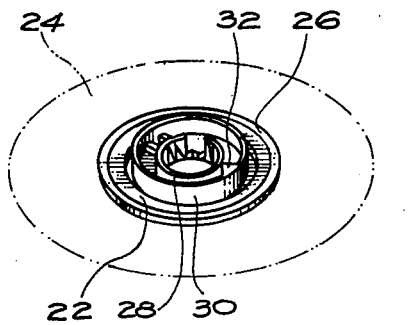
FIG. 3 is a front perspective view of the central core portion of the cartridge assembly of FIG. 1.

Film unit 10, shown front in FIG. 3 and rear in FIG. 1, includes a central core 22, a photographic film disk 24, and a mounting ring 26 which is bonded to core 22 to secure film disk 24. The film disk is illustrated as having a generally circular outer perimeter, but other non-circular (e.g., polygonal) film shapes may be visualized for use in accordance with the present invention. Accordingly, the term "disk" as herein used is intended to include non-circular as well as the illustrated circular configuration. The disk has a plurality of notches, two of which are shown in FIG. 1, for metering purposes.

Referring to FIG. 3, central core 22 includes an inner raised ring 28, about a central opening, and an outer raised ring 30. A projection 32 extends inwardly from ring 30 to form, with a projection 34 on front casing part 18 (FIG. 1), part of an initial and final locking system explained in detail in aforementioned U.S. Patent Application Ser. No. 931,053.

Rear casing part 20 of the cartridge assembly has a circular opening 42, aligned with an exposure window 40 in front casing part 18. An opaque, rigid pressure plate 46 is received in the rear casing part behind the film disk 24 and is movable toward and away from the front casing part to selectively be brought to bear against the rear surface of the film disk. The pressure plate, in bearing against the film disk, presses the film disk into contact with a camera's film support surface extending into exposure window 40. Details of the pressure plate and the camera mechanism which cooperates therewith are disclosed in commonly-assigned, copending U.S. Patent Application Ser. No. 106,630 entitled FILM CARTRIDGE ASSEMBLY WITH PRESSURE PLATE filed in the name of G. S. Sethi on Dec. 26, 1979.

Cover member 14 has a central opening 48 sized to receive an annular wall 49 of casing top part 18 and a plurality of tabs 50 so as to form bearing surfaces such that the cover member can oscillate about an axis parallel to but spaced from the axis of annular wall 49, as explained hereinafter. The cover member is formed of suitably thin but relatively stiff, opaque sheet material and includes a generally fan-shaped leaf portion 52 so sized as to completely cover exposure window 40 when aligned with it.

Figure 4:
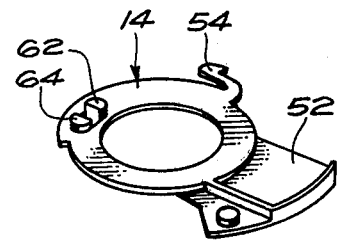
FIG. 4 is a front perspective view of the cover member portion of the cartridge assembly of FIG. 1.

A locking mechanism for preventing inadvertent rotation of the cover member before the cartridge assembly is loaded into a camera includes a tab 54 on cover member 14. The tab is aligned with an aperture 56 in front casing part 18, and engages tooth 58 of the casing top part when leaf portion 52 is aligned with exposure window 40. Tab 54 is depressed by a camera pin 60 (shown in FIG. 5) to release the locking mechanism when the cartridge assembly is received in a camera. Cover member 14 also includes a pair of lugs 62 and 64, shown in FIG. 4, and a ramped tooth 66 shown in FIG. 1. The functions of the lugs and the tooth will be explained hereinafter.

Still referring to FIG. 1, separator layer 12 is formed of an opaque sheet material and has a central aperture 67 sized to receive annular wall 49 and tabs 50 of the casing front part. A framing window 68 in the separator layer is aligned with exposure window 40. A hole 70 in the separator layer is aligned with a raised tooth 72 on top casing part 18 so that the raised tooth may pass through hole 70 and enter notches 38 on the periphery of film disk 24 to inhibit reverse rotation of film unit 10.

Another hole 74 in the separator layer is radially aligned with the notches in disk 24. When cover member leaf portion 52 aligns with exposure window 40; tooth 66 passes through hole 74 and enters a disk notch. It can now be seen that whenever cover member 14 is positioned such that its leaf portion 52 covers exposure window 40, teeth 66 and 72 cooperate with the disk notches to inhibit rotation of disk assembly 10 in either direction. Further, as long as the cartridge assembly is not in a camera, rotation of the cover member from its exposure window closing position is inhibited because tab 54 is hooked on tooth 58.

In this configuration, leaf portion 52 of cover member 14 is in light blocking relationship with exposure window 40 and separator layer window 68. Inasmuch as leaf portion 52 is larger than the aligned windows 40 and 68 between which it is interposed, a labyrinth light baffling arrangment is created to restrict the access of actinic light rays to film disk 24 through the windows.

Figure 5:
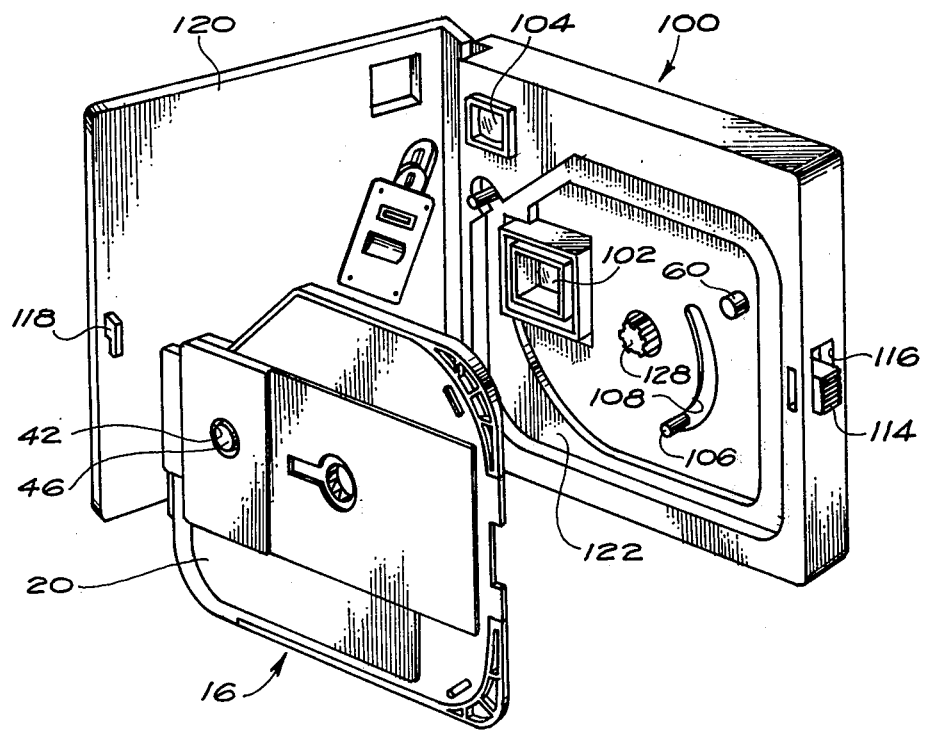
FIG. 5 is a rear perspective view of the cartridge assembly of FIG. 1 and a still picture camera.

The cartridge assembly is adapted to be received in a camera such as shown schematically in FIG. 5 and referred to by numeral 100. The camera is similar to the camera disclosed in aforementioned U.S. Patent Application Ser. No. 106,630 entitled FILM CARTRIDGE ASSEMBLY WITH PRESSURE PLATE. The camera includes a picture-taking lens 102, a view-finder 104 and a pin 106 movable along an arcuate slot 108. A locking tab 114 at one side of camera 100 is movable along a slot 116 to disengage from an internal latch 118 located on a rear door 120 of the camera, whereupon the rear door may be opened for loading a film cartridge assembly into a receiving chamber 122 of the camera.

When the cartridge assembly is received in chamber 122, pin 106, extending from arcuate slot 108, engages film drive lugs 62 and 64 (FIG. 4) on cover member 14. A splined rotatable post 128, projecting into camera chamber 122, extends through the center opening in core 22 of the received cartridge assembly.

When the film cartridge assembly is loaded into camera chamber 122, pin 60 enters the cartridge assembly through aperture 56 to move tab 54 from alignment with tooth 58. Now cover member 14 can be turned by pin 106 from its exposure window closing position. As the cover member turns, tooth 66 is moved from the region of hole 74 in separator layer 12 and rides up on the surface of the separator layer. Now the tooth can no longer enter film disk notches 38, and the film unit can be turned by incremental rotation of splined post 128. This moves successive portions of film disk 24 across exposure window 44.

Figure 6:
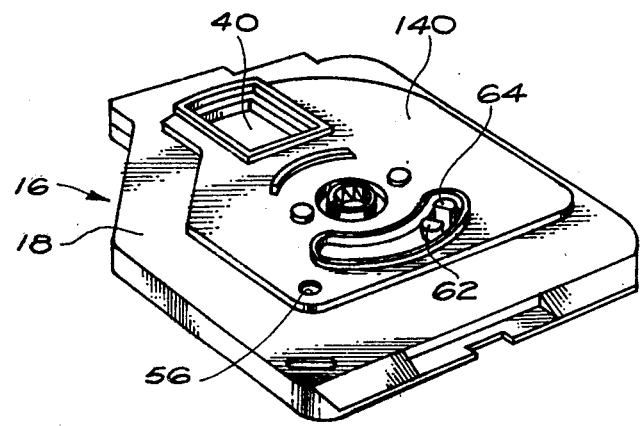
FIG. 6 is a front perspective view of the film cartridge assembly of FIG. 1.

FIG. 6 shows that the cartridge assembly has a raised portion 140 which corresponds generally to a recessed area 142 (FIG. 1) in the inner surface of front casing part 18. The recessed area has been provided to accommodate cover member 14 in its exposure window closing and opening positions. Space for raised portion 140 is provided in camera 100, and it is desirable that such space be kept to a minimum.

Figure 7:
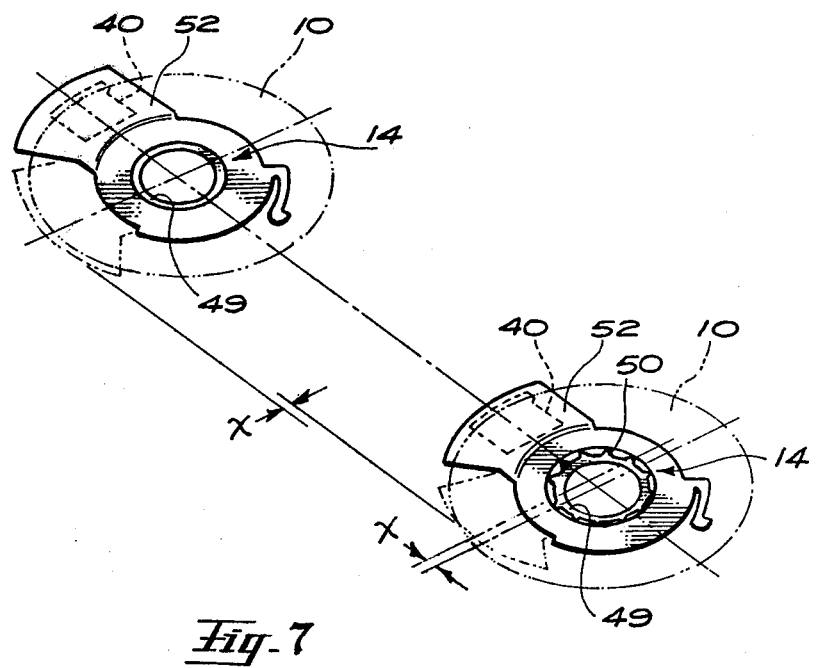
FIG. 7 is a schematic perspective view comparing the space requirements of a cartridge assembly according to the prior art and of the cartridge assembly of FIG. 1.

FIG. 7 is schematic and has exaggerated dimensions for clarity. It compares the lateral space requirements for a cover member 14 mounted concentrically with film unit 10 (upper left illustration) and for a cover member mounted eccentrically with the film unit. It can be seen that by separating the axis of oscillation of the cover member and the axis of rotation of the film unit by a distance x, the length of leaf portion 52 can be shortened by an equal distance x and still adequately cover the cartridge's exposure window 40. As a result, the cover member will extend a shorter distance laterally when in its exposure window opening position. Because of this, raised portion 140 need not be as large and camera chamber 122 can be smaller.

Various structures for mounting cover member 14 for non-coaxial movement with film unit 10 will occur to those skilled in the art. In the illustrated embodiment of the present invention, one such mounting structure has been used involving eccentric bearings. Specifically, tabs 50, referred to hereinbefore are provided to offset the axis of oscillation of cover member 14 from the axis of rotation of film unit 10.

This invention has been described in detail with particular reference to the preferred embodiment thereof, but it will be understood that variations and modifications can be effected within the spirit and scope of the invention.

We claim:

1. In a photographic cartridge assembly of the type having an opaque casing with an exposure window in one wall for rotatably housing a disk of photographic film movable about a fixed axis such that different film portions are moved successively into alignment with the exposure window; the improvement comprising:
   a cover member including an opaque region; and
   means for mounting said cover member in the casing between the one wall and the film disk for oscillatory movement about an axis, different than the axis of rotation of the film disk, back and forth between a closing position in which said opaque region is in alignment with and closes the exposure window and an opening position in which said opaque region is out of alignment with and opens the exposure window.

2. In a photographic cartridge assembly of the type having an opaque casing with an exposure window in one wall for rotatably housing a disk of photographic film movable about a fixed axis such that different film portions are moved successively into alignment with the exposure window; the improvement comprising:
   a cover member including an opaque region; and
   means for mounting said cover member in said casing between the one wall and the film disk for oscillatory movement about an axis back and forth between a closing position in which said opaque region is in alignment with and closes the exposure window and an opening position in which said opaque region is out of alignment with and opens the exposure window, said axis of oscillation of said cover member being (1) parallel to the axis of rotation of the film disk and (2) between the exposure window and the axis of rotation of the film disk.

3. A photographic cartridge assembly of the type having an opaque casing, a photographic film unit and an exposure window in one wall, said cartridge assembly comprising:
   first bearing surfaces on the casing and the film unit for mounting the film unit for rotation about a fixed axis such that different film portions are moved successively into alignment with the exposure window;
   a cover member including an opaque region;
   second bearing surfaces on the casing and said cover member for mounting said cover member in the casing between the one wall and the film unit for oscillatory movement back and forth between a closing position in which said opaque region is in alignment with and closes the exposure window and an opening position in which said opaque region is out of alignment with and opens the exposure window, said first and second bearing surfaces being eccentric.

4. A photographic film unit as defined in claim 3 wherein the center of oscillation of said cover member is between the center of rotation of the film unit and the exposure window.

5. A photographic film unit as defined in claim 3 wherein said second bearing surfaces comprise:
   first wall means on said cover member defining a generally cylindrical radially inwardly facing surface,
   second wall means on said casing defining a generally cylindrical, radially outwardly facing surface; and
   at least one projection extending radially outwardly of said second wall means between first and second wall means to prevent coaxial alignment thereof.

6. A photographic film unit as defined in claim 5 wherein said second cylindrical wall means is coaxial with said axis of rotation of the film unit.

* * * * *